(12) United States Patent
Pedrazzini

(10) Patent No.: US 6,373,650 B1
(45) Date of Patent: Apr. 16, 2002

(54) VOICE COIL MOTOR CONTROL CIRCUIT HAVING ALTERNATIVE MODES OF OPERATION AND METHOD OF OPERATION THEREOF

(75) Inventor: Giorgio Pedrazzini, Laguna Niguel, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/137,760

(22) Filed: Aug. 20, 1998

(51) Int. Cl.[7] ............................................. G11B 21/02
(52) U.S. Cl. ...................... 360/75; 360/78.04; 318/560; 318/432
(58) Field of Search ............................... 360/75, 78.04, 360/61, 67; 318/560, 432

(56) References Cited

U.S. PATENT DOCUMENTS

| | | | |
|---|---|---|---|
| 3,626,264 A | * 12/1971 | Halfhill et al. | 318/331 |
| 4,237,501 A | * 12/1980 | Barmache et al. | 360/75 |
| 5,297,024 A | 3/1994 | Carobolante | 360/67 |
| 5,566,369 A | 10/1996 | Carobolante | 360/75 |
| 5,768,045 A | * 6/1998 | Patton, III et al. | 360/78.04 |
| 5,969,899 A | * 10/1999 | Utenick et al. | 360/78.04 X |

* cited by examiner

*Primary Examiner*—Andrew L. Sniezek
(74) *Attorney, Agent, or Firm*—David V. Carlson; Lisa K. Jorgenson

(57) ABSTRACT

A voice coil motor control circuit provides control signals to a voice coil motor circuit drivel that is coupled to a voice coil motor. A current sensing resistor is coupled in series with the voice coil motor. The control circuit includes a sense amplifier having inputs that couple to the current sensing resistor and includes a feedback circuit that includes an input and also includes an output that couples to the voice coil motor driver. In a first mode of operation, the feedback circuit input is coupled to an output of the sense amplifier. The control circuit also includes an inverting operational amplifier. In the first mode of operation, the inverting operational amplifier is bypassed. In a second mode of operation corresponding to deployment of a read/write head from a parked position onto the disc, the inverting operational amplifier is coupled in series between the sense amplifier output and the feedback circuit input. As a result, a velocity of the voice coil motor is more precisely and accurately controlled.

18 Claims, 3 Drawing Sheets

VOICE COIL MOTOR CONTROL CIRCUIT HAVING ALTERNATIVE MODES OF OPERATION AND METHOD OF OPERATION THEREOF

TECHNICAL FIELD

This invention relates to improvements in electronic circuitry used in moving read/write heads in memory disc drives for use with computers, and, more particularly, to improvements in such circuitry for providing drive signals to voice coil motors for such disc drives.

BACKGROUND OF THE INVENTION

Voice coil motors are linear actuators that are widely used for moving read/write heads and their support assemblies across discs in computer system disc drives in order to read data from or write data to the disc. Voice coil motors also remove the head from the areas of the disc that store data when the disc drive is turned off and deploy the head onto the disc when the disc drive is turned on. The head floats across the disc surface on a cushion of air resulting from rotation of the disc. In a conventional disc drive, the disc is roughened on at least portions of the disc surface to obviate sticking of the head to the disc surface as the disc is spun from a stop to an operating speed.

As data densities on the discs have increased, the need for greater precision and accuracy in head positioning has also increased. Additionally, spacings between the heads and the discs have decreased to a point where the roughening of the disc surface is impractical. As a result of these changes, a prior art practice of "parking" the head in the innermost data track no longer provides adequate safeguarding of the head or of the disc when the computer system is not in use.

In increasing numbers of disc drives, the head is parked by causing the head and support assembly to traverse a ramp to remove the head from proximity to the disc when the disc drive is deactivated as the system is shut down. When the support assembly for the head reaches the end of the ramp, the head is latched into a storage position. The head then cannot collide with the disc if the disc drive is jarred or bumped, avoiding one potential source of damage to the head or to the disc.

As the system is reactivated, the head is unparked by releasing the latch in response to a UNPARK HEAD command. The head and support assembly then traverse the ramp towards the disc in response to signals delivered to the voice coil motor from a controller. The head must be moving with the correct speed when the support assembly arrives at the end of the ramp in order to be maintained in proximity to the disc without collision between the head and the disc. As a result, the controller must provide drive signals to the voice coil motor resulting in the correct speed for the head when the support assembly for the head exits the ramp.

One method for driving a voice coil motor includes applying a constant voltage to a voice coil in the voice coil motor. However, the voice coil motor generates a back electromotive force (BEMF) because the voice coil is moving in a magnetic field. The actual voltage driving the voice coil motor thus is the sum of the applied voltage and the BEMF, which varies with voice coil motor velocity $v_M$. As a result, the applied voltage is not the actual voltage driving the voice coil motor.

FIG. 1 is a simplified schematic diagram of a driving circuit 10 and voice coil 11 of a voice coil motor in a disc drive, in accordance with the prior art. The voice coil has a first terminal 11' and a second terminal 11". The driving circuit 10 includes a current sensing resistor 12 having a resistance $R_{SENSE}$ and coupled to the voice coil 11. A voltage across terminals of the current sensing resistor 12 is proportional to the current through the voice coil 11 which is driven by power amplifiers 13, 14 and 15 having a gain $A_P$, as is explained below in more detail. The voltage across the current sensing resistor 12 is sensed by a sense amplifier 16 having a gain $A_S$ to provide a feedback signal. The feedback signal is added to an analog control signal $V_{IN}$ and the resulting voltage is then compared to a reference voltage $V_{REF}$ by an input amplifier 17 having a gain $A_E$ that is determined by resistor 18 and RC network 19. An output signal from the input amplifier 17 is then applied to the voice coil 11 by the drive amplifiers 13–15.

Conventional voice coil motor controller circuits employ a digital to analog converter circuit (not shown) for providing the analog control signal $V_{IN}$ to the driving circuit 10 in response to digitally preprogrammed profiles. However, these voice coil motor controller circuits have limited ability to compensate for effects due to wearing of the ramp and of those portions of the head supporting assembly that are in contact with the ramp. Additionally, the feedback provided by the driving circuit 10 does not compensate for voltage errors in the voltage actually present in the voice coil 11 that result from a dc resistance $R_{MOTOR}$ of the voice coil 11.

SUMMARY OF THE INVENTION

In one aspect, the present invention includes a voice coil motor driver circuit providing feedback from a voice coil motor coupled to the driver circuit in a disc drive. The voice coil motor driver circuit provides positive feedback having a first loop gain in a head parking or unparking mode of operation and provides negative feedback together with a second loop gain in other modes of operation. The voice coil motor driver circuit is thus able to compensate for errors in a voltage driving the voice coil motor resulting from a dc resistance of a voice coil in the voice coil motor. The voice coil motor driving circuit is also able to compensate for changes in the voice coil motor properties with time or with temperature changes and for effects caused by motion of the disc drive. As a result, head velocity is more precisely controlled during a head unparking operation, reducing probability of damage to the head or disc.

DETAILED DESCRIPTION OF THE INVENTION

Figure 1:
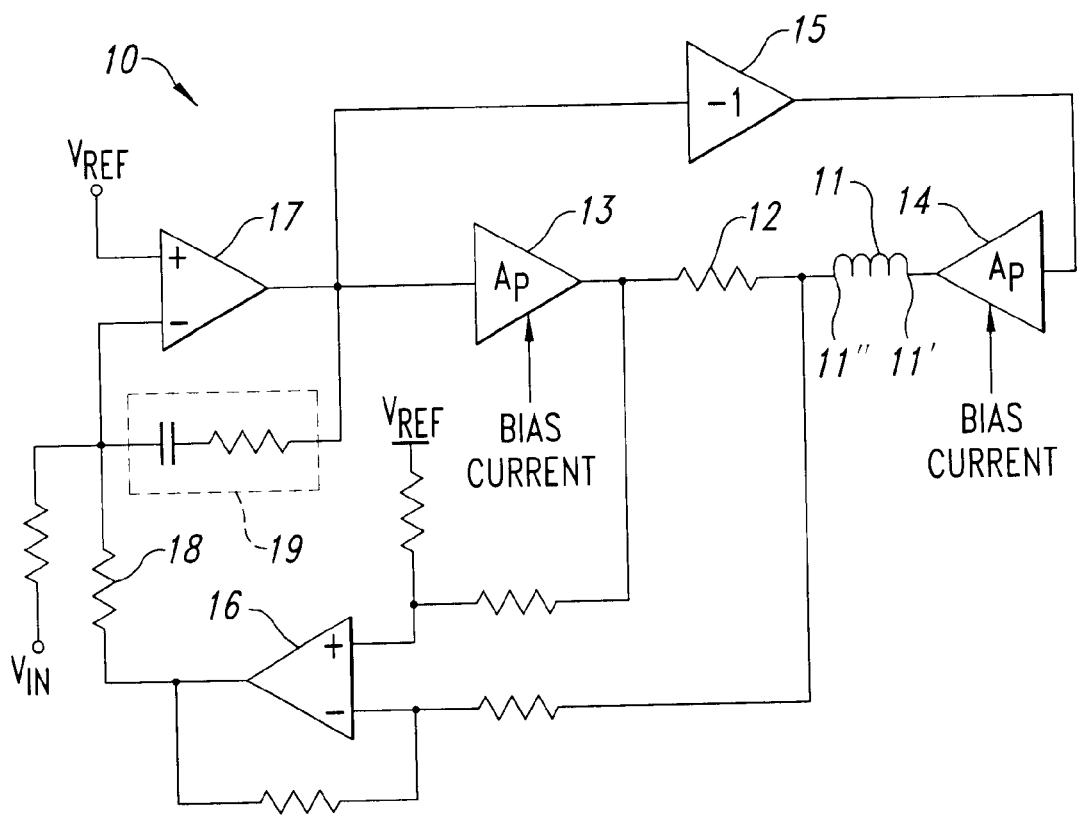
FIG. 1 is a simplified schematic diagram of a driving circuit and voice coil for a voice coil motor in a disc drive, in accordance with the prior art.
Figure 2:
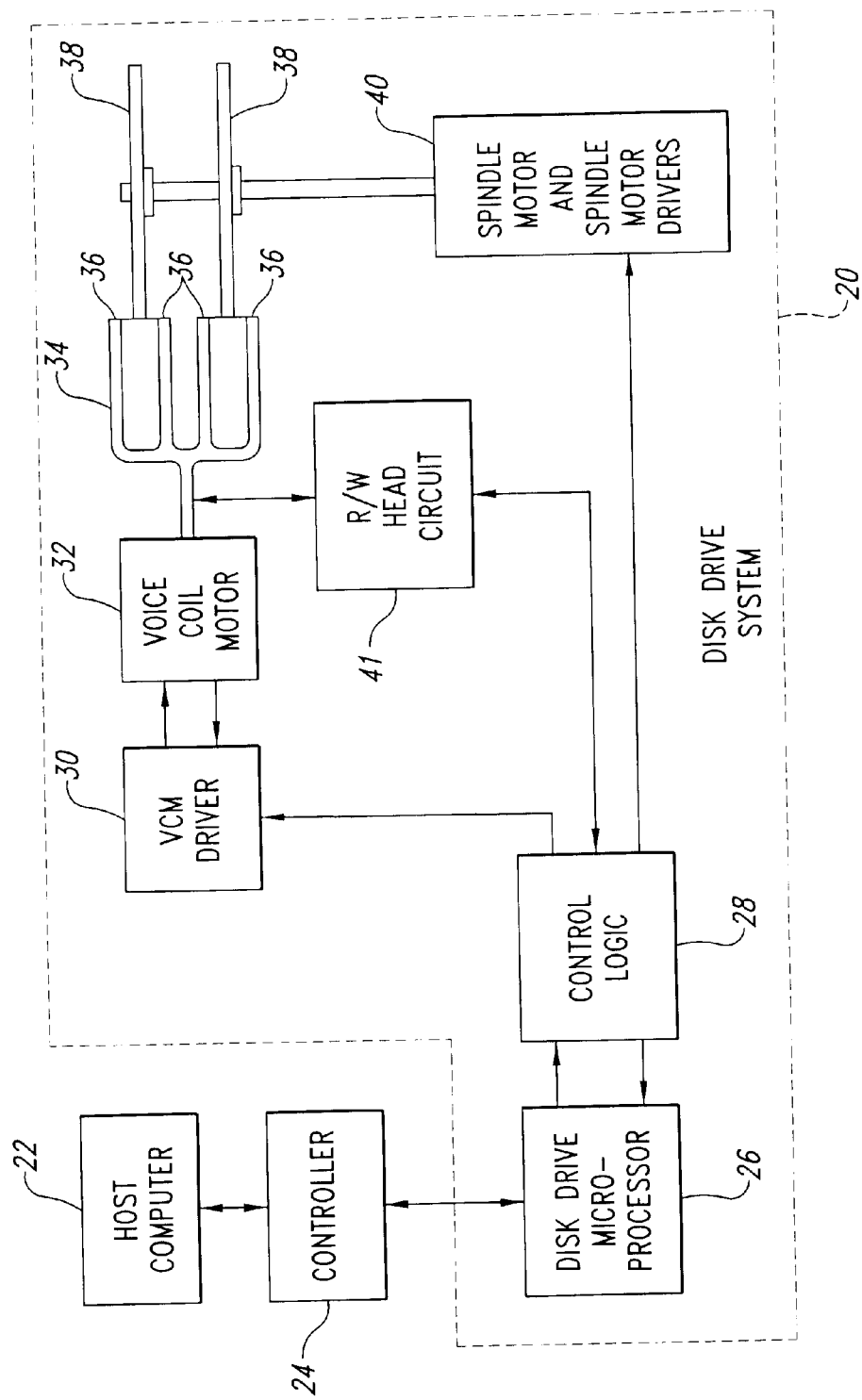
FIG. 2 is a simplified block diagram of an embodiment of a disc drive, in accordance with embodiments of the present invention.

FIG. 2 is a simplified block diagram of an embodiment of a disc drive 20, in accordance with the present invention. The disc drive 20 is coupled to a host computer 22 through a controller 24 that provides instructions to a disc drive microprocessor 26. The disc drive microprocessor 26, in turn, provides commands to control logic 28, which decodes the commands into control signals, some of which are coupled to a voice coil motor driver circuit 30. A voice coil motor 32 that includes the voice coil 11 of FIG. 1 moves in response to these control signals, causing a head support system 34 to move heads 36 across discs 38, or to park or unpark the heads 36. A spindle motor and spindle motor drive circuit 40 cause the discs 38 to rotate in response to other control signals from the control logic 28. A read/write (R/W) head circuit 41 is coupled between the heads 36 and the control logic 28. In response to control signals from the control logic 28, the R/W head circuit 41 delivers data read from the discs 38 by the heads 36 to the control logic 28 and delivers write data from the control logic 28 to the heads 36, which write the data to the discs 38.

Figure 3:
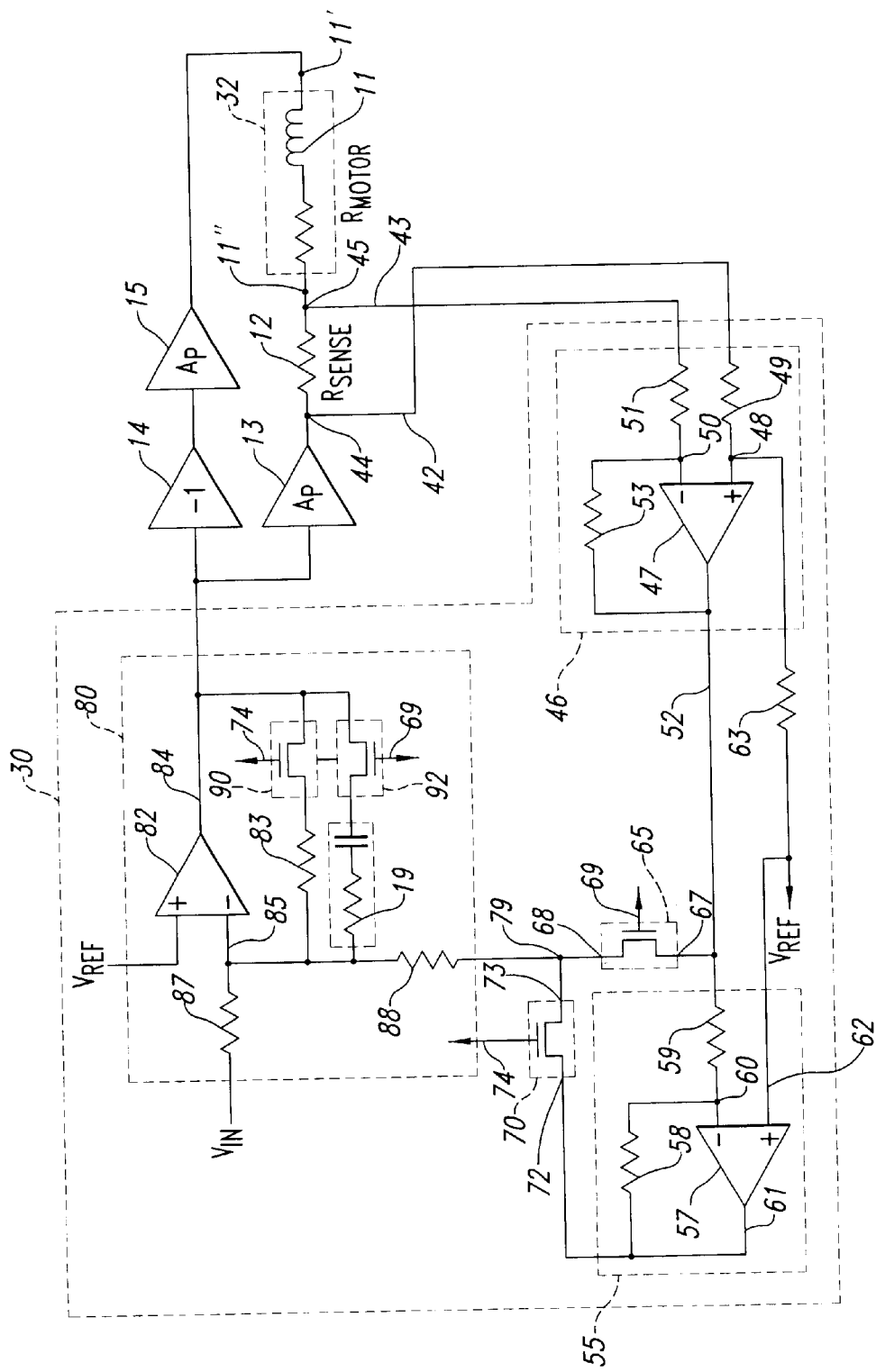
FIG. 3 is a simplified schematic diagram of an embodiment of a first control circuit for a voice coil motor useful in the embodiment of the disc drive of FIG. 2, in accordance with embodiments of the present invention.

FIG. 3 is a simplified schematic diagram of an embodiment of the voice coil motor driver circuit 30 for the voice coil motor 32 of FIGS. 1 and 2 that is useful in the embodiment of the disc drive 20 of FIG. 2, in accordance with the present invention. The voice coil motor driver circuit 30 includes first and second sense lines 42, 43 that are connected to first and second terminals 44, 45 at opposite sides of the sense resistor 12 (see also FIG. 1). The first and second sense lines 42, 43 are coupled to a sense amplifier 46. The sense amplifier 46 corresponds to the sense amplifier 16 of FIG. 1 and includes a first operational amplifier 47 having non-inverting input 48 coupled to the first sense line 42 through a first input resistor 49. The first operational amplifier 47 also has an inverting input 50 coupled to the second sense line 43 through a second input resistor 51 and has an output 52 that is also an output of the sense amplifier 46. The sense amplifier 46 also includes a feedback resistor 53 that, in conjunction with the second input resistor 51, sets the gain $A_S$ for the sense amplifier 46.

In one embodiment, the voice coil motor driver circuit 30 also includes a ramping amplifier 55 that includes a second operational amplifier 57 having a gain −K determined by a ratio of resistances of a resistor 58 and a resistor 59. The resistor 58 is coupled to an inverting input 60 to the operational amplifier 57 and to an output 61 of the operational amplifier 57 that is also an output to the ramping amplifier 55. The resistor 59 is coupled between the input 60 of the operational amplifier 57 and the output 52 of the sense amplifier 46. A noninverting input 62 to the second operational amplifier 57 is coupled through a resistor 63 to the noninverting input 48 to the first operational amplifier 47. The noninverting input 62 is also coupled to a reference voltage $V_{REF}$. In one embodiment, the ramping amplifier 55 is included in a feedback path for the voice coil motor driver circuit 30 in head parking and unparking modes of operation and is bypassed in other modes of operation through operation of one or more switches 65, 70, as is explained below in more detail.

The switch 65 may be realized as a pass gate or as a N-channel MOSFET switch. The switch 65 includes a first terminal 67 coupled to the output 52 of the sense amplifier 46 and a second terminal 68 coupled to the output 61 of the second operational amplifier 57 through the optional switch 70.

The switch 65 also includes a control terminal 69 that is coupled to an output (not shown) of the control logic 28 (FIG. 2).

The switch 70 includes a first terminal 72 that is coupled to the output 61 of the second operational amplifier 57 and a second terminal that is coupled to the second terminal 68 of the first switch 65. The switch 70 also includes a control terminal 74 that is coupled to an output (not shown) of the control logic 28 (FIG. 2). The switch 70 may be realized as a solid state switch such as a pass gate or as a N-channel MOSFET switch.

In the head parking and unparking modes of operation of the voice coil motor driver circuit 30, the switch 65 provides an open circuit between the first and second terminals 67, 68 of the switch 65 in response to control signals from the control logic 28 that are coupled to the control terminal 69. The switch 65 thus allows the ramping amplifier 55 to modify signals from the sense amplifier 46. The switch 70 provides a short circuit between terminals 72, 74 in these modes of operation in response to control signals coupled to the control terminal 74 from the control logic 28. The switch 70 thus couples the output 61 of the ramping amplifier 55 to an input 79 to a feedback amplifier 80 in these modes of operation.

In other modes of operation, the switch 65 provides a short circuit between the first and second terminals 67, 68. The switch 65 thus couples signals from the output 52 of the sense amplifier 46 to the input 79 of the feedback amplifier 80, bypassing the ramping amplifier 55. The switch 70 decouples the output 61 of the ramping amplifier 55 from the input 79 to the feedback amplifier 80, disabling the ramping amplifier 55.

The feedback amplifier 80 includes a third operational amplifier 82 that corresponds to the amplifier 17 of FIG. 1 and acts as a summing circuit, combining signals from the first or second operational amplifiers 50, 57 with the signal $V_{IN}$ (FIG. 1) from the control logic 28. The feedback amplifier 80 includes the RC network 19 of FIG. 1 coupled between an output 84 of the third operational amplifier 82 and an inverting input 85 of the third operational amplifier 82. The output 84 of the third operational amplifier 82 is also the output of the feedback amplifier 80. The feedback amplifier 80 includes a resistor 86 that is coupled between the inverting input 85 and the input 79 to the feedback amplifier 80. The resistor 86 and the RC network 19 set the gain $A_E$ for the third operational amplifier 80. A resistor 87 couples the inverting input 85 to the third operational amplifier 80 to signals $V_{IN}$ from the control logic 28 (FIG. 2). In one embodiment, the signals $V_{IN}$ from the control logic 28 are analog signals from a digital to analog converter (not illustrated), The digital to analog converter is provided with predetermined digital values by the disc drive microprocessor 26 (FIG. 2) to influence the velocity $v_M$ of the voice coil motor 32.

As a result, in one embodiment, the voice coil motor driver circuit 30 uses the ramping amplifier 55 to provide positive feedback during the park and unpark operations and also to approximately compensate for voltages resulting from the resistance $R_{SENSE}$ of the current sensing resistor 12 or from the dc resistance $R_{MOTOR}$ of the voice coil 11. The positive feedback provided by the ramping amplifier 55 in the voice coil motor drivel circuit 30 does not result in oscillation when a magnitude of an open loop gain of the voice coil motor driver circuit 30 is less than unity. In turn, this requires that $(R_{MOTOR}+R_{SENSE})>A_S \cdot A_P \cdot A_E \cdot R_{SENSE} \cdot 2 \cdot K$.

Additionally, the gain −K for the ramping amplifier 55 allows the magnitude of the loop gain for the voice coil motor driver circuit 30 in the bead parking and unparking modes of operation to be optimized for the resistance $R_{MOTOR}$ and also for the resistance $R_{SENSE}$. The loop gain for the voice coil motor driver circuit 30 in the head parking and unparking modes of operation can be different from the loop gain when the ramping amplifier 55 is bypassed.

The second operational amplifier 57 in the ramping amplifier 55 and ancillary circuitry associated with the ramping amplifier 55 require relatively little additional silicon area when the voice coil motor driver circuit 30 is fabricated as an integrated circuit. In one embodiment, the integrated circuit forming the voice coil motor driver circuit 30 may optionally include the power amplifiers 13–15.

Also, the BEMF of the voice coil motor 32 is related to the actual motor velocity $v_M$ as given by BEMF=$K_e v_M$, where $K_e$ is a motor design constant whose value can be calculated with greater accuracy than is required for the motor velocity $v_M$. The second operational amplifier 57 allows the actual BEMF in the voice coil 11 (FIG. 1) to be forced to a desired value by compensating for effects due to the resistance $R_{MOTOR}$. As a result, the BEMF and $K_e$ are known and thus the motor velocity $v_M$ can be controlled more precisely during head parking or unparking than is possible without the ramping amplifier 55.

In one embodiment, the present invention includes two switches 90 and 92. The switch 90 has a control input 74 that is coupled to the control input 74 of the switch 70. As a result, when the ramping amplifier 55 is included in the feedback path, the open loop gain reflects feedback via the resistor 83, rather than the RC network 19.

The switch 92 has a control input 69 that is coupled to the control input 69 of the switch 65. As a result, when the ramping amplifier 55 is bypassed by the switch 65, the open loop gain reflects feedback via the RC network 19, rather than the resistor 83. The switches 90 and 92 provide an additional technique whereby the open loop gain may be different in the two modes of operation.

Disc drives 20 including the head unparking and control circuitry for such applications may provide significant advantages over other types of disc drives, including reduced head and disc wear and increased data storage density leading to increased storage capacity. The present invention also allows increased overall disc drive reliability due to reduced probability of collision between the heads and the disc. Disc drives find application in most computers where, for example, operating systems as well as programs and data are stored and may be modified.

Improved disc head parking and unparking control circuits and methods have been described. Although the present invention has been described with reference to specific embodiments, the invention is not limited to these embodiments. Rather, the invention is limited only by the appended claims, which include within their scope all equivalent devices or methods which operate according to the principles of the invention as described.

What is claimed is:

1. A disc drive including a voice coil driver circuit comprising:

at least one disc;

a spindle motor driver;

a spindle motor mechanically coupled to the disc and causing the disc to rotate or not rotate in response to signals from the spindle motor driver;

a control logic unit electrically coupled to the spindle motor driver and supplying control signals thereto;

a voice coil motor;

at least one head coupled to the voice coil motor, the head reading and writing data to and from the disc; and a voice coil motor driver having inputs coupled to the control logic unit and having outputs coupled to the voice coil motor, the voice coil motor driver supplying electrical signals to the voice coil motor, the voice coil motor driver comprising:

a pair of power amplifiers having a common input terminal and equal gain magnitudes but opposite gain sign, a first of the pair having an output coupled to a first terminal of the voice coil motor and a second of the pair having an output coupled to a second terminal of the voice coil motor;

a current sensing resistor coupled in series with the voice coil motor;

a first operational amplifier having a first input coupled to a first terminal of the current sensing resistor and a second input coupled to a second terminal of the current sensing resistor, the first operational amplifier having a first gain;

a first switch having a first terminal coupled to an output of the first operational amplifier;

a second operational amplifier having an inverting input coupled to the first terminal of the first switch, a noninverting input coupled to a reference voltage and an output coupled to a second terminal of the first switch;

a third operational amplifier having an input coupled to the second terminal of the first switch and an output coupled to the common input of the pair of power amplifiers;

a second switch, the second switch having a first terminal coupled to the output of the second operational amplifier and a second terminal coupled to the inverting input of the third operational amplifier, an open circuit being formed between the first and second terminals of the second switch in the normal mode of operation and a short circuit being formed between the first and second terminals of the second switch in the head parking or unparking modes of operation; and a controller coupled to the first switch such that, when in a normal mode of operation, the output of the first operational amplifier is coupled to the input of the third operational amplifier, and, when in a head-parking or head-unparking mode of operation, the output of the first operational amplifier is coupled to an input of the second operational amplifier and an output of the second operational amplifier is coupled to the input to the third operational amplifier.

2. The disc drive of claim 1 wherein the first switch comprises a pass gate.

3. The disc drive of claim 1 wherein the second operational amplifier has a gain compensating for a resistance of the voice coil motor.

4. The disc drive of claim 1 wherein, when in the normal mode of operation, the voice coil motor driver provides negative feedback, and where, in the head-parking or head-unparking mode of operation, the voice coil motor driver provides positive feedback coupled with a loop gain having a magnitude of less than unity.

5. The disc drive of claim 1 wherein, when in the normal mode of operation, the first and second terminals of the first switch are electrically coupled together, and in the head parking or unparking mode of operation, the first and second terminals of the first switch are electrically isolated from each other.

6. The disc drive of claim 5 wherein the second switch comprises a pass gate.

7. The disc drive of claim 1 wherein, in the normal mode of operation, the feedback amplifier provides a first gain, and where, in the head parking or unparking mode of operation, the feedback amplifier is switched to provide a second gain.

8. A control circuit for driving a voice coil motor comprising:

a current sensing circuit coupled to said voice coil motor;

a sense amplifier having an input coupled to an output of the current sensing circuit;

a ramping amplifier circuit having an input coupled to an output of the sensing amplifier circuit;

a drive amplifier circuit having an input selectively coupled to an output of the sensing amplifier circuit and an output coupled to a drive circuit for driving the voice coil motor;

a first switching circuit coupled between the output of the sensing amplifier circuit and an input of the drive amplifier circuit for selectively connecting the output of the sensing amplifier circuit to the drive amplifier circuit; and a second switching circuit coupled between an output of the ramping amplifier circuit and the input of the drive amplifier circuit for selectively connecting the output of the ramping amplifier circuit to the input of the drive amplifier circuit when the sense amplifier circuit is not connected to the input of the drive amplifier circuit and for selectively disconnecting the output of the ramping amplifier circuit from the input of the drive amplifier circuit when the output of the sense amplifier circuit is connected to the input of the drive amplifier circuit.

9. The circuit according to claim 8, further including a voltage reference source coupled to a positive input of the ramping amplifier circuit and the output of the sense amplifier circuit is coupled to a negative input of the ramping amplifier circuit.

10. A circuit for driving a voice coil motor of a disc drive read head comprising:

a sense amplifier circuit coupled to an output of the voice coil motor;

an operational amplifier having an input coupled to an output to form the sense amplifier circuit and providing an output;

a positive feedback amplifier circuit path having an output selectively coupled for driving the voice coil motor as a function of a positive feedback signal;

a negative feedback amplifier circuit path having an input selectively coupled to the output of the sense amplifier circuit and having an output coupled to a drive circuit for driving the voice coil motor as a function of a negative feedback signal;

a first switch circuit coupled between the output of the sense amplifier circuit and the input of the negative feedback amplifier drive circuit path for selectively connecting the output of the sense amplifier circuit to the input of the negative feedback amplifier drive circuit path so that the voice coil motor is driven as a function of a negative feedback in a first mode of operation; and a second switch circuit coupled between the output of the positive feedback amplifier drive circuit path and the input of the negative feedback amplifier circuit path for selectively connecting the output of the sense amplifier circuit to the input of the negative feedback amplifier drive circuit path via the positive feedback amplifier circuit path so that the voice coil motor is driven as a function of a positive feedback during a second mode of operation.

11. The circuit according to claim 10, further including a third switching circuit for selectively coupling a first negative feedback element into the negative feedback path.

12. The circuit according to claim 11, further including a fourth switching circuit for selectively coupling a second, different negative feedback element into the negative feedback path.

13. The circuit according to claim 10, further including a circuit for selecting either the first or second negative feedback elements for coupling in the amplifier drive circuit during a third or fourth mode of operation, respectively.

14. A method of driving a voice coil motor comprising:

sensing the current passing through the voice coil motor using a sensing amplifier circuit;

outputting a signal from the sensing amplifier circuit;

driving the voice coil motor with a negative feedback circuit path which is coupled to receive the output signal from the current sensing amplifier circuit during a first mode of operation of the voice coil motor;

driving the voice coil motor with a positive feedback circuit path which is coupled to receive the output signal of the current sensing amplifier circuit during a second mode of operation of the voice coil motor; and selectively connecting one of a first switch circuit coupled between the output of the current sensing amplifier circuit and the negative feedback circuit path and a second switch circuit coupled between the output of the current sensing amplifier circuit and the positive feedback circuit path in order to selectively operate in the first mode of operation or the second mode of operation.

15. The method according to claim 14, wherein said first mode of operation is a normal operation mode used when reading data from a disc drive and the second mode of operation is during parking or unparking the head of a disc drive.

16. The method according to claim 14, further including selectively switching a first negative feedback element into the negative feedback circuit during the first mode of operation.

17. The method according to claim 14, further including selectively switching a second negative feedback element into the negative feedback circuit during the second mode of operation.

18. The method according to claim 14, further including selectively connecting a ramping amplifier circuit into the feedback circuit during the second mode of operation, the ramping amplifier circuit changing the sign of the feedback so as to provide a positive feedback loop.

* * * * *